United States Patent
Hehlen et al.

(10) Patent No.: US 10,291,711 B1
(45) Date of Patent: May 14, 2019

(54) REAL-TIME PREDICTIVE SENSOR NETWORK AND DEPLOYABLE SENSOR

(71) Applicant: Triad National Security, LLC, Los Alamos, NM (US)

(72) Inventors: Markus Hehlen, Los Alamos, NM (US); Michael Brown, Los Alamos, NM (US); Janette Frigo, Los Alamos, NM (US); William Priedhorsky, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 15/868,517

(22) Filed: Jan. 11, 2018

Related U.S. Application Data

(63) Continuation-in-part of application No. 15/259,121, filed on Sep. 8, 2016, now Pat. No. 10,015,259, which
(Continued)

(51) Int. Cl.
*H04L 29/08* (2006.01)
*G01D 9/00* (2006.01)
(Continued)

(52) U.S. Cl.
CPC ............ *H04L 67/12* (2013.01); *G01D 9/00* (2013.01); *H04Q 9/02* (2013.01);
(Continued)

(58) Field of Classification Search
CPC ......... G08B 21/10; G08B 21/12; H04L 67/12; H04W 52/0258; H04W 84/18; G01D 9/00;
(Continued)

(56) References Cited

U.S. PATENT DOCUMENTS

| | | |
|---|---|---|
| 8,275,313 B1 | 9/2012 | Myers et al. |
| 2002/0060267 A1* | 5/2002 | Yavnai ................ G05D 1/0038 244/23 A |

(Continued)

FOREIGN PATENT DOCUMENTS

WO    WO 2008145676 A2 * 12/2008

OTHER PUBLICATIONS

Saito et al., Journal of Environmental Radioactivity, vol. 139, Jan. 2015.*
(Continued)

*Primary Examiner* — Raymond S Dean
(74) *Attorney, Agent, or Firm* — LeonardPatel PC; Michael Aristo Leonard, II; Sheetal Suresh Patel

(57) ABSTRACT

Deployable, predictive sensor systems may form a sensor network configured to provide environmental data in real-time or near-real-time. The sensors may be deployable sensors that can be launched and/or airdropped in areas that may be contaminated or otherwise unsafe for humans to enter. The predictive sensor network may include sensor tetrapods that may include anemometers for measuring wind speed, radiation sensors, gaseous contaminant sensors, biological sensors, and/or any other desired sensor type. These sensors may inform wind, transport and dispersion models in real-time. The sensor tetrapods may be satellite-linked, linked via a cellular network, linked via RF line-of-sight, a wireless communication link, and/or another compatible wireless network to a wind, dispersal, and deposition model that provides a dispersion pattern, a deposition pattern, and a wind pattern to enable a high-quality remote assessment of the changing scene in real-time.

19 Claims, 9 Drawing Sheets

Related U.S. Application Data is a continuation of application No. 15/138,672, filed on Apr. 26, 2016, now abandoned.

(60) Provisional application No. 62/153,295, filed on Apr. 27, 2015.

(51) Int. Cl.
 *H04Q 9/02* (2006.01)
 *H04W 52/02* (2009.01)
 *H04W 84/18* (2009.01)

(52) U.S. Cl.
 CPC .... *H04W 52/0258* (2013.01); *H04Q 2209/25* (2013.01); *H04Q 2209/40* (2013.01); *H04Q 2209/826* (2013.01); *H04Q 2209/86* (2013.01); *H04Q 2209/883* (2013.01); *H04W 84/18* (2013.01)

(58) Field of Classification Search
 CPC .. H04Q 9/02; H04Q 2209/25; H04Q 2209/40; H04Q 2209/86; H04Q 2209/826; H04Q 2209/883
 See application file for complete search history.

(56) References Cited

U.S. PATENT DOCUMENTS

| | | | |
|---|---|---|---|
| 2003/0218540 A1* | 11/2003 | Cooper | G08B 21/10 340/539.26 |
| 2007/0040673 A1* | 2/2007 | Bohine, Jr. | G01T 1/167 340/539.26 |
| 2007/0041333 A1 | 2/2007 | Twitchell | |
| 2008/0057863 A1 | 3/2008 | Jalali | |
| 2008/0287144 A1* | 11/2008 | Sabata | H04L 67/12 455/456.6 |
| 2008/0291006 A1 | 11/2008 | Kang et al. | |
| 2012/0256762 A1* | 10/2012 | Greenberger | H04Q 9/00 340/870.03 |
| 2013/0294261 A1 | 11/2013 | Ghosh et al. | |
| 2014/0252099 A1* | 9/2014 | Hatton | F24F 7/06 236/44 A |
| 2015/0003309 A1 | 1/2015 | Mukherjee | |
| 2015/0139198 A1 | 5/2015 | Hwang et al. | |
| 2016/0091614 A1* | 3/2016 | Akers | G01T 1/167 250/261 |
| 2016/0361222 A1* | 12/2016 | Publicover | A63B 21/023 |
| 2017/0124885 A1* | 5/2017 | Patterson | B64C 39/024 |

OTHER PUBLICATIONS

"QUIC: A Fast, High-Resolution 3D Building-Aware Urban Transport and Dispersion Modeling System", Brown, 2014, Air and Waste Management Association.*

"XBee for Arduino and Raspberry Pi," Cooking Hacks, https://www.cooking-hacks.com/documentation/tutorials/xbee-arduino-raspberry-pi-tutorial/(last accessed Apr. 26, 2016).

Actel Igloo Product Page, http://www.actel.com/FPGA/handheld/?p=sn (last accessed Apr. 26, 2016).

Alexandra Saari et al., "Small Burst Data (SBD) Satellite Communications," LA-UR-14-26452, http://permalink.lanl.gov/object/tr?what=info:lanl-repo/lareport/LA-UR-14-26452, issued Aug. 14, 2014 (last accessed Dec. 10, 2015).

Brennan et al., "Radioactive Source Detection by Sensor Networks," IEEE Transactions on Nuclear Science, vol. 52, No. 3, pp. 813-819 (Jun. 2005).

David B. Johnson, David A. Maltz, and Josh Brach, "DSR: The Dynamic Source Routing Protocol for Multi-Hop Wireless Ad Hoc Networks," Mobile Computing (1996).

Digi XBEE-PRO 900HP RF MODEMS White Sheet, http://www.mouser.com/ds/2/111/ds_xbeepro_900hp_rfmodem-372442.pdf (last accessed Apr. 26, 2016).

Frigo et al., "Energy Efficient Sensor Node Implementations," ACM/SIGDA International Symposium on Field Programmable Gate Arrays (FPGA) 2010, Monterey, California, http://www.edwardrosten.com/work/frigo_2010_efficient.pdf (Feb. 21-23, 2010).

Frigo et al., "Exploring Reconfigurable Hardware Architectures for Distributed Sensor Network Systems," SenSys 2008, Raleigh, NC (Nov. 5-7, 2008).

Frigo et al., "Radiation Detection and Situation Management by Distributed Sensor Networks," SPIE Proceedings on Defense, Security and Sensing (2009).

Frigo et al., "Sensor Network Based Vehicle Classification and License Plate Identification System," IEEE INSS (2009).

Ganguly et al., "Knowledge Discovery from Sensor Data for Security Applications," chap 13, pp. 205-229 (2007).

Gu et al., "Lightweight Detection and Classification for Wireless Sensor Networks in Realistic Environments," SenSys 05, San Diego, California (Nov. 2005).

Igloo Overview Page, http://www.microsemi.com/products/fpga-soc/fpga/igloo-overview (last accessed Apr. 26, 2016).

LPC ARMS Page, http://www.nxp.com/products/microcontrollers-and-processors/arm-processors/lpc-arm7-arm9-mcus/lpc-arm9-mcrocontrollers:MC_1423301659316?cof=0&am=0 (last accessed Apr. 26, 2016).

Mouser Electronics XBee Purchase Page, http://www.mouser.com/Search/Refine.aspx?Keyword=xbee (last accessed Apr. 26, 2016).

Nemzek et al., "Distributed Sensor Networks for Detection of Mobile Radioactive Sources," IEEE Transactions on Nuclear Science, vol. 51, No. 4, pp. 1693-1700 (Aug. 16, 2004).

Non-Final Office Action received in U.S. Appl. No. 15/259,121 dated Nov. 11, 2017.

Parunak et al., "Swarming Pattern Detection in Sensor and Robot Networks," ANS 10th Conference on Robotics and Remote Systems for Hazardous Environments, Gainsville, FL (2004).

Quinlan, "Induction of Decision Trees," Machine Learning 1, pp. 81-106 (1986).

Saari et al., "Using SDI-12 with ST Microelectronics MCU's," http://permalink.lanl.gov/object/tr?what=info:lanl-repo/lareport/LA-UR-15-26961 (Sep. 3, 2015).

Saint Gobain Web Page, http://www.crystals.saint-gobain.com/ (last accessed Apr. 26, 2016).

Stephens et al., "Detection of Moving Radioactive Sources Using Sensor Networks," IEEE Transactions on Nuclear Science, vol. 51, No. 5, pp. 2273-2278 (Oct. 2004).

Viola et al., "Rapid Object Detection using a Boosted Cascade of Simple Features," Conference on Computer Vision and Pattern Recognition (2001).

Raymond S. Dean, "Advisory Action", dated Feb. 15, 2018, U.S. Appl. No. 15/259,121.

Raymond S. Dean, "Notice of Allowance", dated Apr. 20, 2018, U.S. Appl. No. 15/259,121.

* cited by examiner

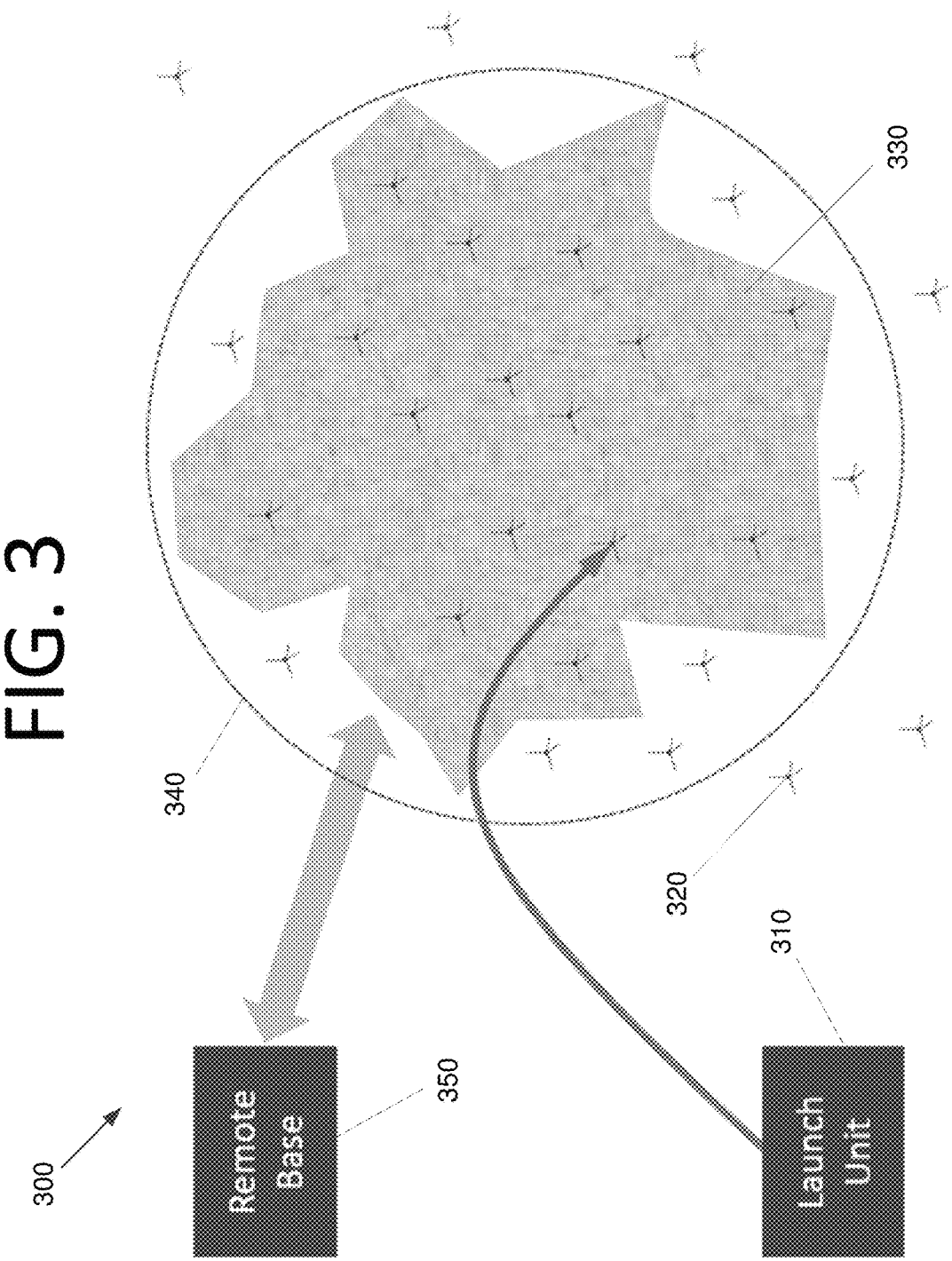

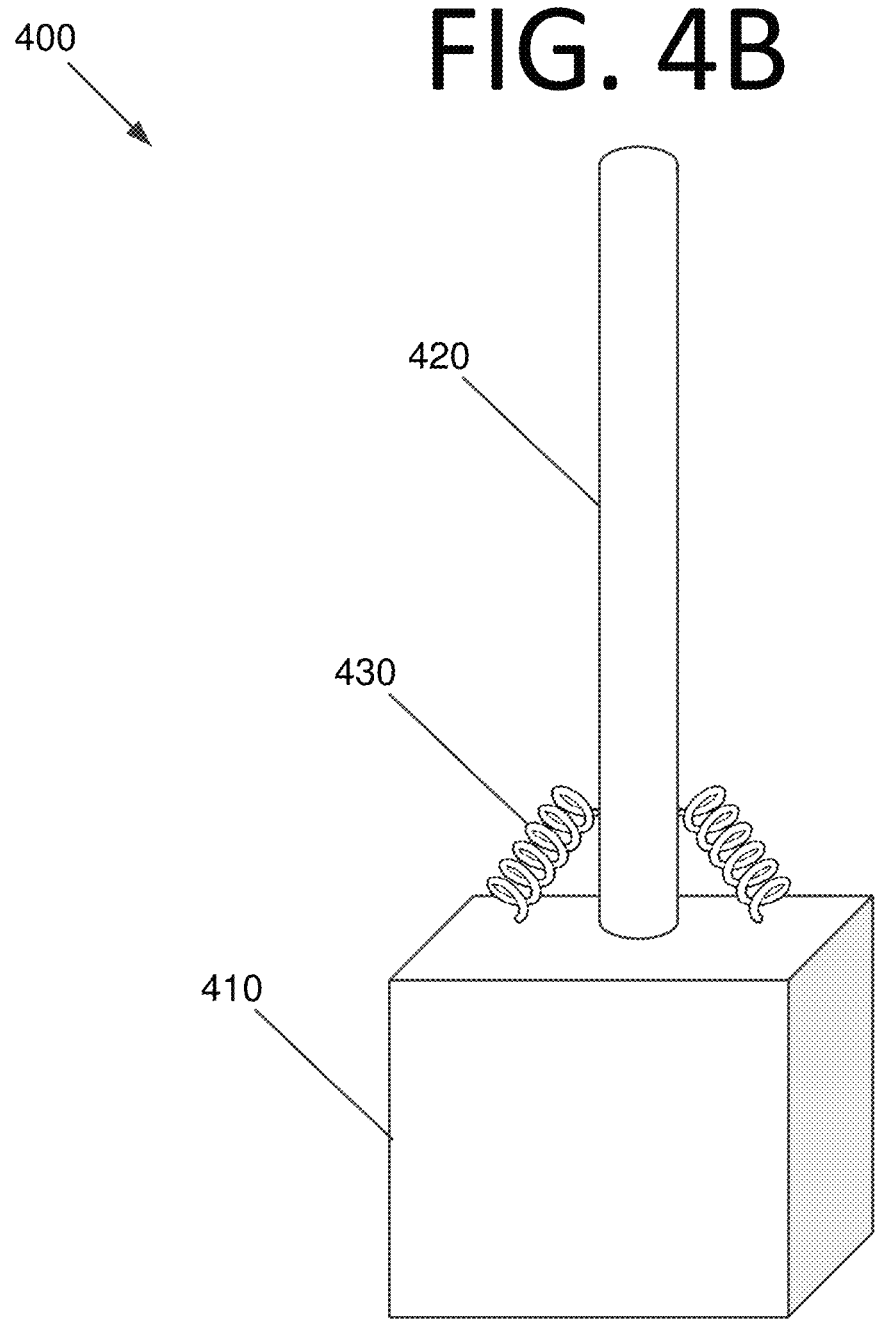

REAL-TIME PREDICTIVE SENSOR NETWORK AND DEPLOYABLE SENSOR

CROSS REFERENCE TO RELATED APPLICATION

This application is a continuation-in-part (CIP) of U.S. Nonprovisional patent application Ser. No. 15/259,121 filed Sep. 8, 2016, which is a continuation of U.S. Nonprovisional patent application Ser. No. 15/138,672 filed Apr. 26, 2016, which claims the benefit of U.S. Provisional Patent Application No. 62/153,295 filed Apr. 27, 2015. The subject matter of these earlier filed applications is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to sensor systems, and more particularly, to deployable, predictive sensor systems that form a sensor network configured to provide environmental data in real-time or near-real-time and a deployable sensor that can be launched and/or airdropped in areas that may be contaminated or otherwise unsafe for humans to enter.

BACKGROUND

The immediate aftermath of a contamination event, such as a toxic gas release from a chemical plant, derailment of a train carrying toxic chemicals or gases, or a nuclear or radiological spill, leak, or attack, poses an extraordinary challenge for emergency responders and authorities. Using conventional technology and approaches, highly consequential decisions must be made rapidly based on incomplete information gathered manually by a few personnel in the "hot zone." A small number of hand-carried sensors and short measurement times combined with unknown wind-driven transport of contamination result in a crude picture of the scene, at best.

In the case of a train derailment, for example, this may have significant consequences as many citizens live within the ¼ mile evacuation zone of an active freight train line. The consequences of a contamination event include, but are not limited to, short and long-term health effects and/or loss of life, infrastructure damage, exposure to contamination, damage to the environment, decreased real estate value, and lost business revenue. The 74 car crude oil train derailment in Lac-Mégantic, Quebec on Jul. 6, 2013, caused a fire and explosion of several cars that killed 47, destroyed over 30 buildings, forced the evacuation of over 2,000 people, lead to liability to Montreal Maine and Atlantic Railway Ltd. (MMA) railway of over $345 million, and lead to over $25 million in claims to local insurers. Indeed, a major freight accident may be a "bet the company" event with liability in the millions or billions of dollars, a high cost of remediation, and damaged public relations and stock values. Accordingly, an improved sensor system and approach may be beneficial.

SUMMARY

Certain embodiments of the present invention may provide solutions to the problems and needs in the art that have not yet been fully identified, appreciated, or solved by conventional sensor system technologies. For example, some embodiments of the present invention pertain to deployable, predictive sensor systems that form a sensor network configured to provide environmental data in real-time or near-real-time. The sensors in some embodiments are deployable sensors that can be launched and/or air-dropped in areas that may be contaminated or otherwise unsafe for humans to enter.

In an embodiment, a system includes a plurality of deployable sensors and at least one computing system. The plurality of deployable sensors are configured to collect information pertaining to contaminants, environmental parameters, and position, and transmit the collected information to the at least one computing system. The at least one computing system is configured to receive the transmitted information collected by the plurality of deployable sensors and calculate a concentration, transport, and dispersal of the contaminants using a predictive model. The at least one computing system is also configured to produce a contamination map based on the calculated concentration, transport, and dispersal of the contaminants from the predictive model, and transmit the contamination map to at least one user device.

In another embodiment, a deployable sensor includes a sensor body housing components configured to collect information pertaining to contaminants, environmental parameters, and position, and transmit the collected information to the at least one computing system. The deployable sensor also includes a plurality of legs attached to the sensor such that the sensor can be deployed ballistically, dropped from manned or unmanned aircraft, or both.

In yet another embodiment, a computing system includes memory storing computer program code for predictive modeling of contaminants and at least one processor configured to execute the computer program code. The computing system is configured to receive information collected by a plurality of deployable sensors pertaining to contaminants, environmental parameters, and position, and calculate a concentration, transport, and dispersal of the contaminants using a predictive model. The computing system is also configured to produce a contamination map based on the calculated concentration, transport, and dispersal of the contaminants from the predictive model, and transmit the contamination map to at least one user device.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 illustrates a ballistically deployed sensor network, in accordance with an embodiment of the present invention.

FIG. 4B is a perspective view illustrating the deployable tetrapod sensor of FIG. 4A with springs to snap the legs into a geometric configuration when released for deployment, according to an embodiment of the present invention. Only one leg is shown in this view.

DETAILED DESCRIPTION OF THE EMBODIMENTS

Some embodiments of the present invention pertain to deployable, predictive sensor systems that form a sensor network configured to provide environmental data in real-time or near-real-time. The sensors in some embodiments may be deployable sensors that can be launched and/or airdropped in areas that may be contaminated or otherwise unsafe for humans to enter. In some embodiments, the predictive sensor network includes sensor tetrapods that may include anemometers for measuring wind speed, radiation sensors, gaseous contaminant sensors, biological sensors, and/or any other desired sensor type without deviating from the scope of the invention. These sensors may inform wind, transport and dispersion models in real-time. The sensor tetrapods may be satellite-linked, linked via a cellular network, linked via RF line-of-sight, a wireless communication link, and/or another compatible wireless network to a wind, dispersal, and deposition model that provides a dispersion pattern, a deposition pattern, and a wind pattern to enable a high-quality remote assessment of the changing scene in real-time.

The information obtained by the sensor tetrapods may be compressed and communicated to globally or locally accessible servers or other computing master nodes or systems using the satellite, cellular, RF line-of-sight, a wireless communication link, etc. using communications capabilities of the sensor tetrapods. These servers or other computing systems may then use an advanced predictive model, such as the Quick Urban & Industrial Complex (QUIC) model developed by Los Alamos National Laboratory, to incorporate the continuous data stream provided by the sensor tetrapods to accurately predict the concentration, transport, and dispersal of contaminants in near-real-time. QUIC includes extensively validated plume modeling code for urban areas, has detailed building models for over 130 U.S. cities, and can provide predictions for urban areas within a few minutes on a laptop. However, any suitable model may be used without deviating from the scope of the invention.

Such a predictive sensor network may provide emergency responders with actionable information of unprecedented quality without exposing personnel to contaminants. This new capability may enable state, local, and federal emergency response services to provide optimal consequence management, and thus mitigate the impact of a contamination event. Indeed, embodiments of the present invention may save lives, reduce or minimize damage to infrastructure and the environment, and speed up recovery after a contamination event.

Figure 1:
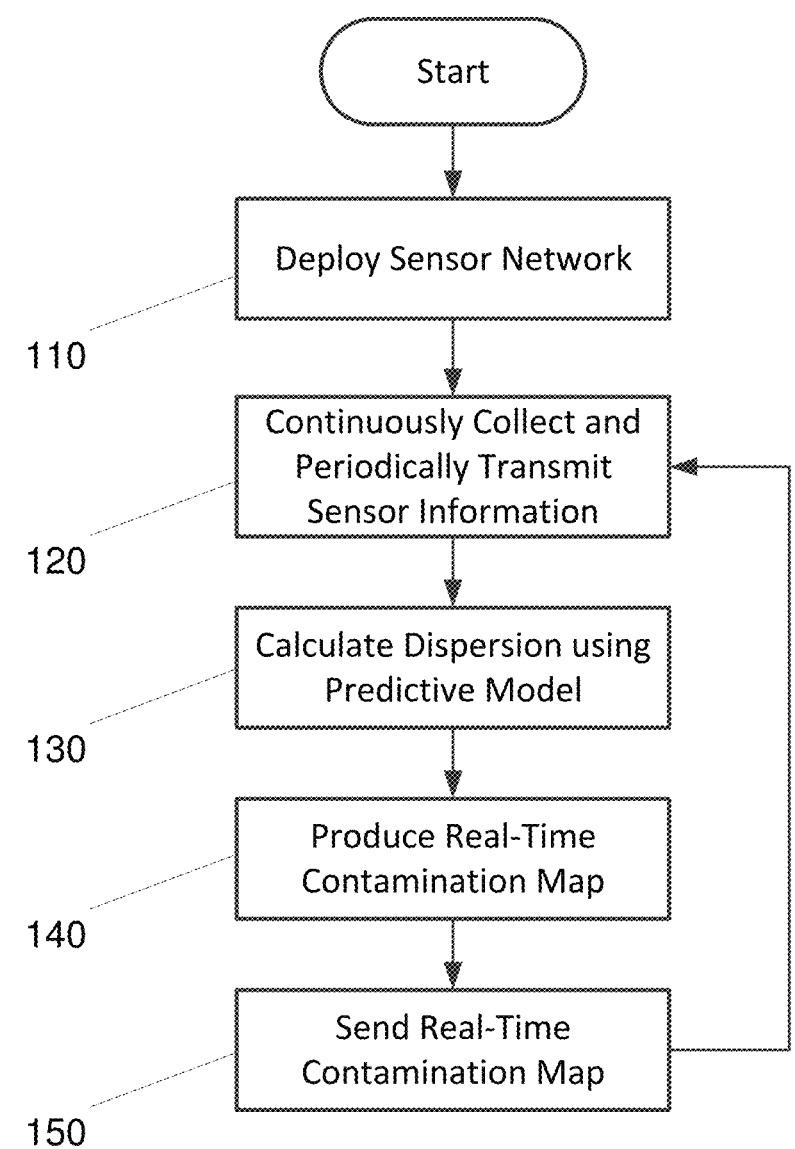
FIG. 1 is a flowchart illustrating use of a real-time, predictive sensor network to respond to a contamination event, according to an embodiment of the present invention.

FIG. 1 is a flowchart 100 illustrating use of a real-time, predictive sensor network to respond to a contamination event, according to an embodiment of the present invention. The process begins with deploying sensors that form a network at 110. The sensors then continuously collect information pertaining to contaminants and wind direction and speed, and periodically transmit this information to a cellular network, a satellite network, RF line-of-sight, a wireless communication link, or any combination thereof, at 120. Servers, local master computing nodes, and/or any other suitable computing systems receive this sensor information and calculate the concentration, transport, and dispersal of contaminants using a predictive model at 130. The servers or other computing systems then use the calculations to produce a real-time contamination map at 140, and send the real-time contamination map to first responders, the affected community, state and/or local government agencies, the military, and/or any other individuals, group, or agency without deviating from the scope of the invention. The contamination map may be received by, and displayed on, any suitable user device, such as a smart phone, a laptop computer, a desktop computer, a tablet, and/or any other suitable user device without deviating from the scope of the invention. The process then returns to step 120, and is periodically repeated to keep other individuals, groups, and/or agencies informed of the updated map and/or any other suitable information without deviating from the scope of the invention.

Figure 2:
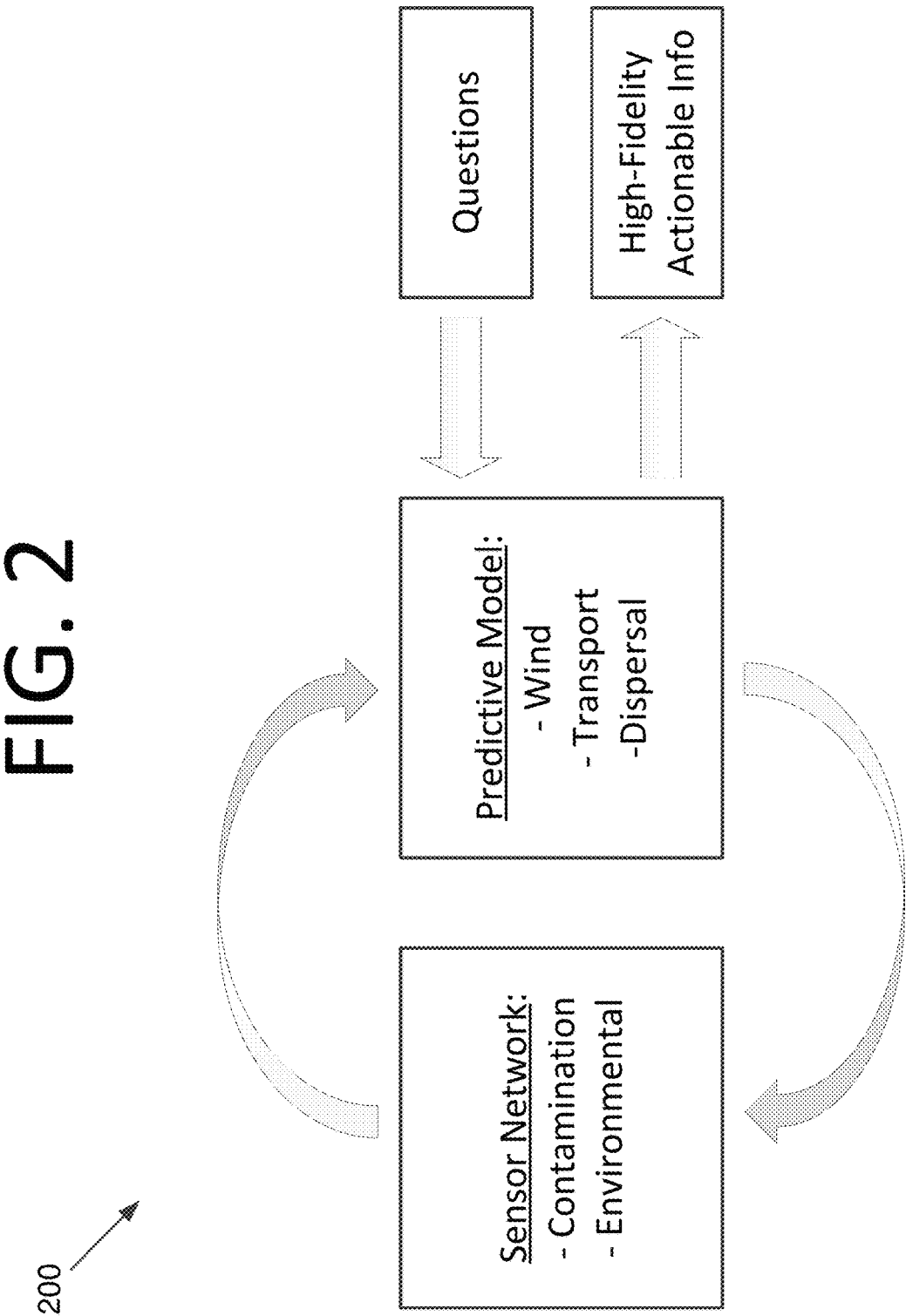
FIG. 2 is a process diagram illustrating a machine learning approach to assessing sensor information in the context of a predictive model, according to an embodiment of the present invention.

Some embodiments provide a machine learning approach to wind, transport, and dispersal modeling. FIG. 2 is a process diagram 200 illustrating a machine learning approach to assessing sensor information in the context of a predictive model, according to an embodiment of the present invention. A deployed sensor network provides spatial data on contamination (e.g., radiation, chemical contaminants, biological contaminants, etc.) and environmental parameters. This data may be received from multiple sensors which may transmit at the same time, at different times, asynchronously, continuously, periodically, or an any desired manner so long as the data is received sufficiently rapidly enough to be useful (e.g., real-time, near-real-time, every minute, every five minutes, etc.). A predictive model receives and uses the sensor data to calculate wind, transport, and dispersion, and provides high fidelity actionable information and predictions based on the calculations. Questions are fed back into the model, which learns from previous predictions and uses this feedback and previous predictions to make new predictions. In some embodiments, the feedback cycle may be executed on a timescale of ~1 minute for urban scenarios.

Per the above, some embodiments may be deployed by aircraft or a launched delivery system, and/or be installed on a permanent fixture in the environment. FIG. 3 is a top view that illustrates a ballistically deployed sensor network 300, in accordance with an embodiment of the present invention. A ballistic launch unit 310 (e.g., a rocket, a cannon, etc.) launches tetrapod sensors 320 into and around a contaminated area 330. A radius 340 denotes a typical circle of a hot zone (e.g., ~250 meter radius for radiological contamination from a dirty bomb explosion). However, it should be noted that drones, manned aircraft, or any other suitable mechanism for deploying tetrapod sensors 320 may be used without deviating from the scope of the invention.

Once deployed, tetrapod sensors 320 transmit information to a remote base 350, which includes one or more master nodes, local computing systems, or global computing systems. Remote base 350 may receive communications directly, or may receive sensor data from a satellite network, a cellular network (not shown), RF line-of-sight, and/or a wireless communication link. As such, ballistically deployed sensor network 300 provides a rapid remote assessment of contaminated area 330.

Figure 4A:
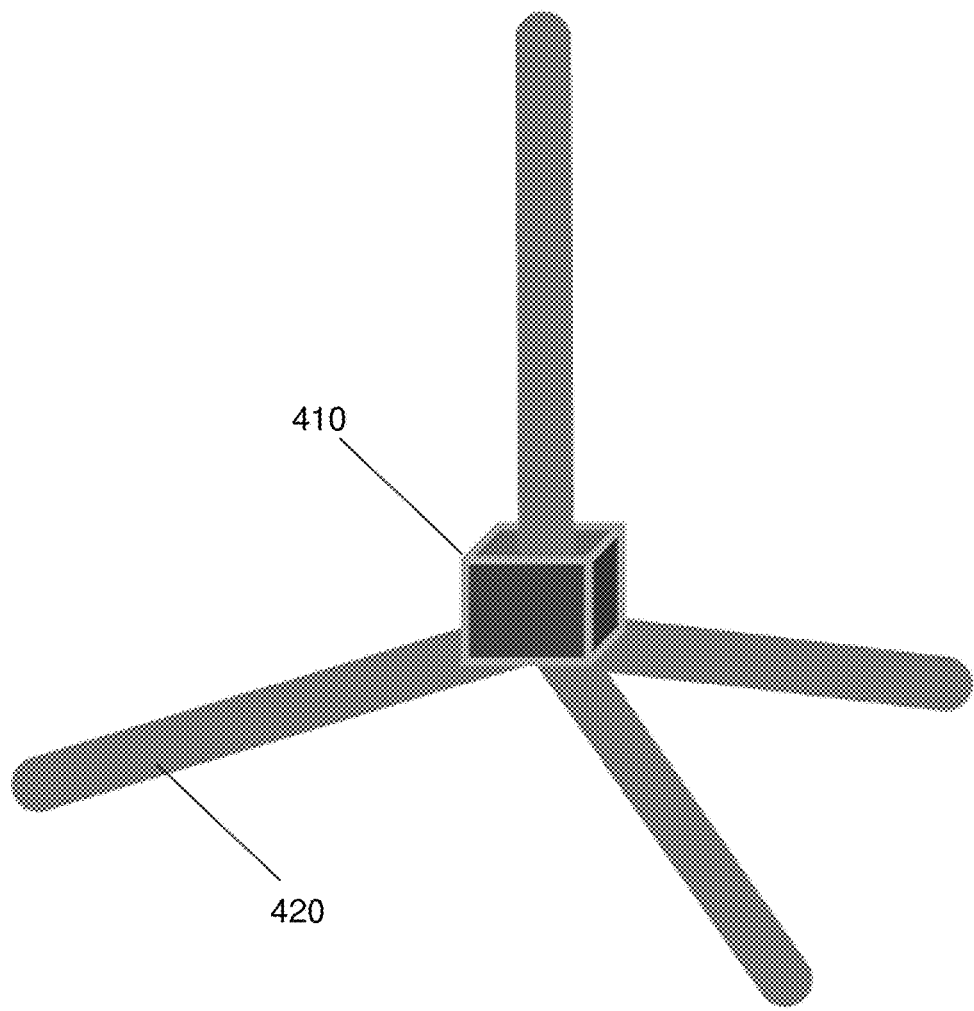
FIG. 4A is a perspective view illustrating a deployable tetrapod sensor, according to an embodiment of the present invention.

FIG. 4A is a perspective view illustrating a deployable tetrapod sensor 400, according to an embodiment of the present invention. Deployable tetrapod sensor 400 includes a sensor body 410 (e.g., a rugged casing). Deployable tetrapod sensor 400 also includes a rugged tetrapod made up of four legs 420 attached to sensor body 410. Legs 420 may be fixed or may be collapsible for easier loading with other tetrapod sensors. For instance, legs 420 may include one or more springs 430 (see FIG. 4B) that encourage them to snap back into a tetrapod configuration once released. While two springs 430 are shown in FIG. 4B, any suitable number of springs (e.g., 1, 3, 4, etc.) may be included without deviating from the scope of the invention. A locking mechanism (not shown) may hold legs 420 in position once they are deployed. The tetrapod configuration of legs 420 ensures that components inside sensor body 410 can be deployed without being damaged when deployable tetrapod sensor 400 hits the ground. However, any desired number and orientation of legs may be used in some embodiments without deviating from the scope of the invention (e.g., hexapod, octopod, etc.). Also, it should be noted that in some embodiments, the deployable sensors may be covered in foam, rubber, or any other suitable material without deviating from the scope of the invention in order to cushion impact upon landing.

Figure 5:
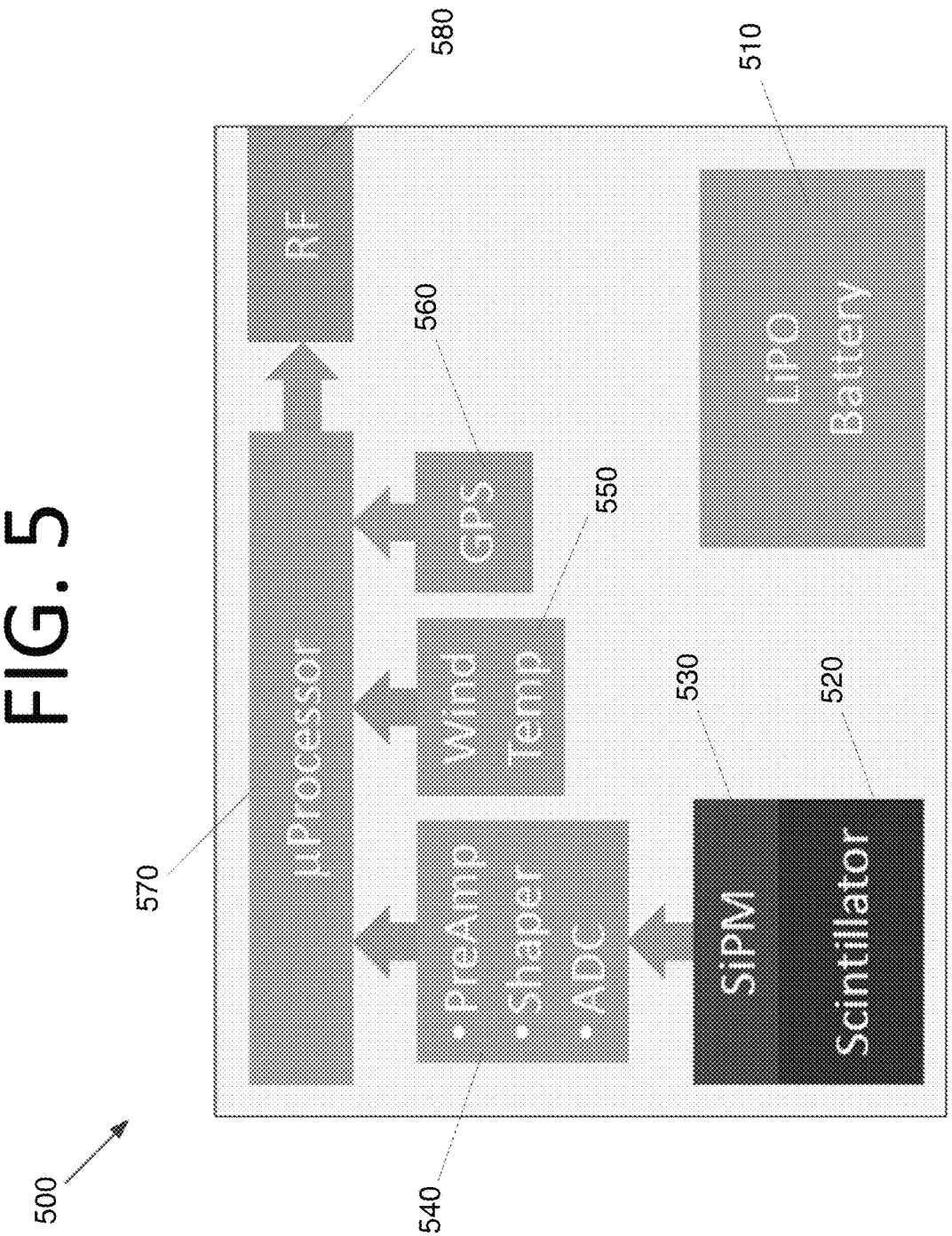
FIG. 5 is an architectural diagram illustrating hardware components of a deployable sensor, according to an embodiment of the present invention.

FIG. 5 is an architectural diagram illustrating hardware components 500 of a deployable sensor, according to an embodiment of the present invention. The deployable sensor is powered by a lithium-polymer (LiPO) battery 510 in this embodiment. However, any suitable battery, such as a lithium ion battery, may be used without deviating from the scope of the invention.

A scintillator 520 emits light when struck by ionizing radiation (e.g., by gamma ($\gamma$) rays). In some embodiments, scintillator 520 may be approximately 1 cm$^3$. A photomultiplier 530 (e.g., a silicon photomultiplier, or SiPM, as shown here), or any other suitable light detector, produces an analog electrical signal in response to detecting light emitted by scintillator 520. Signal processing circuitry 540, which includes a preamplifier, a pulse shaper, and an analog-to-digital converter (ADC), receives the analog electrical signals from SiPM 530 and converts them into a digital signal that can be processed by microprocessor 570.

In addition to radiation detection signals from signal processing circuitry 540, SiPM 530, and scintillator 520, microprocessor 570 also receives environmental data from environmental sensor 550 (e.g., an anemometer and a thermometer) and location data from global positioning system (GPS) 560. Microprocessor 570 processes this data and then transmits it via radio frequency (RF) circuitry 580 to a remote base. For instance, the transmitted information may be sent periodically (e.g., every minute) and may include gamma ($\gamma$) rate, $\gamma$ spectrum, neutron rate, environmental information, position information, etc. The remote base may receive this information from multiple deployable sensors, feed the information to a predictive model, and send updated map information, and any other desired information, to interested individuals to be displayed on a user interface.

Figure 6A:
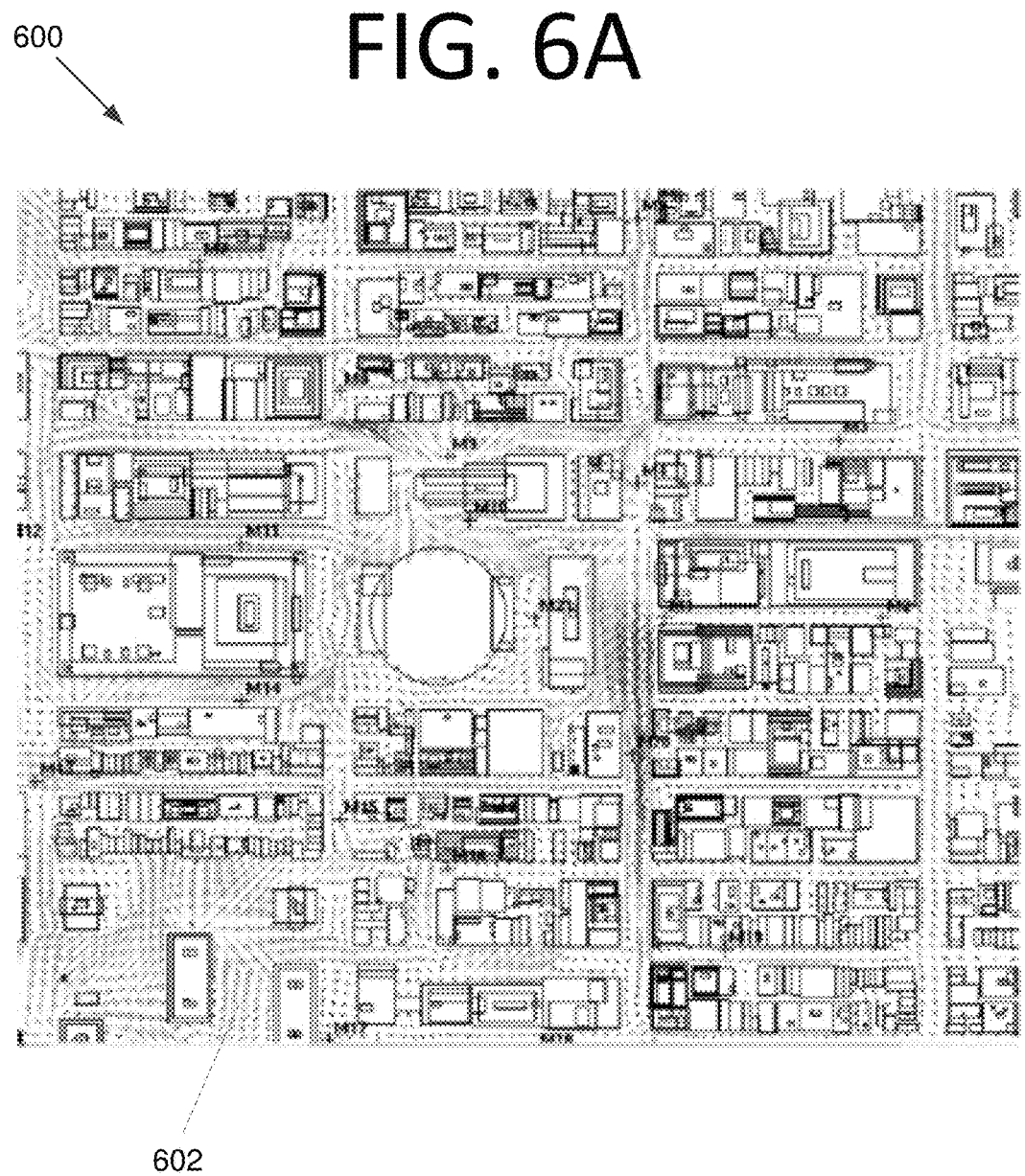
FIG. 6A is a map illustrating wind as modeled by the QUIC transport and dispersion modeling system, according to an embodiment of the present invention.
Figure 6B:
FIG. 6B is a map illustrating dispersion as modeled by the QUIC transport and dispersion modeling system, according to an embodiment of the present invention.

FIGS. 6A and 6B illustrate a transport map 600 and a dispersion map 610, respectively, of the Oklahoma City business district as modeled by the QUIC transport and dispersion modeling system, according to an embodiment of the present invention. In FIG. 6A, wind patterns 602 are shown based on wind-sensor data input, building flow parameterizations, and mass conservation. In FIG. 6B, plume concentrations 612 are modeled using 10,000 marker particles that are transported and dispersed using the building-resolved winds computed by the QUIC wind solver and the turbulence computed by the QUIC random-walk plume solver.

Figure 7:
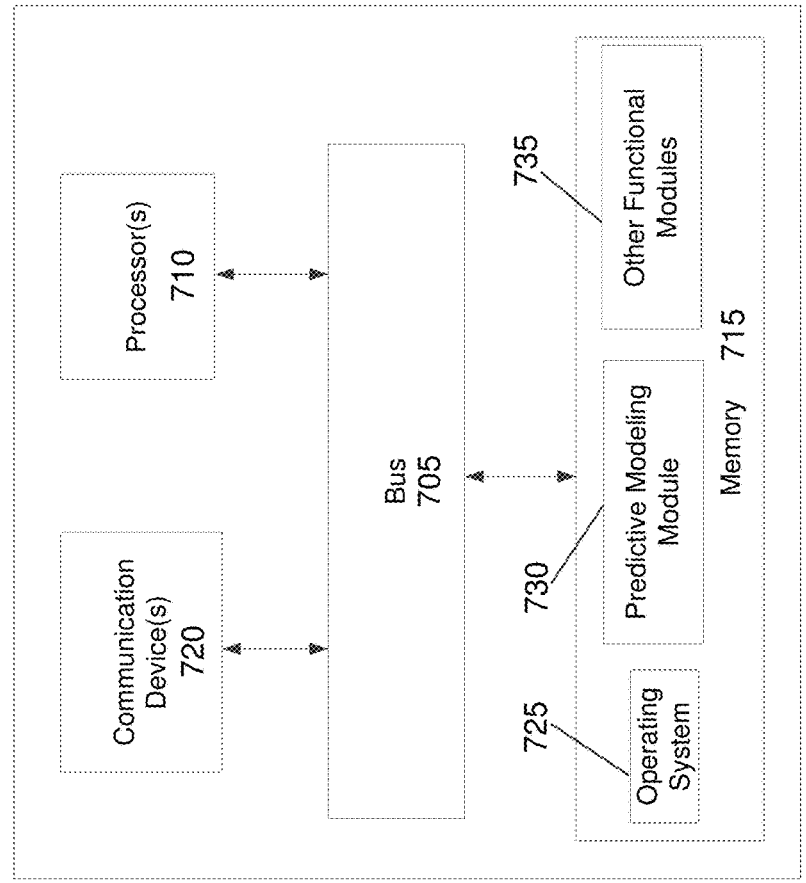
FIG. 7 is a block diagram illustrating a computing system configured to run a predictive model, according to an embodiment of the present invention.

FIG. 7 is a block diagram illustrating a computing system 700 configured to run a predictive model, according to an embodiment of the present invention. Computing system 700 may be a local master node, server, laptop computer, desktop computer, smart phone, tablet, or any other suitable computing system without deviating from the scope of the invention. Computing system 700 includes a bus 705 or other communication mechanism for communicating information, and processor(s) 710 coupled to bus 705 for processing information. Processor(s) 710 may be any type of general or specific purpose processor, including, but not limited to, a central processing unit (CPU), application specific integrated circuit (ASIC), field programmable gate array (FPGA), or any combination thereof. Processor(s) 710 may also have multiple processing cores, and at least some of the cores may be configured to perform specific functions. Computing system 700 further includes a memory 715 for storing information and instructions to be executed by processor(s) 610. Memory 715 can be comprised of any combination of random access memory (RAM), read only memory (ROM), flash memory, cache, static storage such as a magnetic or optical disk, or any other types of non-transitory computer-readable media or combinations thereof. Additionally, computing system 700 includes one or more communication devices 720, such as a transceiver or network card.

Non-transitory computer-readable media may be any available media that can be accessed by processor(s) 710 and may include volatile media, non-volatile media, removable media, and/or non-removable media.

Memory 715 stores software modules that provide functionality when executed by processor(s) 710. The modules include an operating system 725 for computing system 700. The modules further include a predictive modeling module 730 that is configured to execute a predictive model (e.g., QUIC) based on data received from deployable sensors. Computing system 700 may include one or more additional functional modules 635 that include additional functionality.

It should be noted that some of the features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention as claimed, as generally described and illustrated in the figures herein, may be arranged and designed in a wide variety of different configurations. Thus, the detailed description of the embodiments of the present invention, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
a plurality of deployable sensors, each deployable sensor comprising at least four collapsible legs with respective springs that snap the at least four legs into a geometric configuration when released for deployment, the at least four collapsible legs protecting the respective deployable sensor during unpowered landing after being released for deployment regardless of an orientation in which the deployable sensor lands, the collapsible legs facilitating more compact packing with other deployable sensors prior to deployment; and
at least one computing system, wherein
the plurality of deployable sensors are configured to:
collect information pertaining to contaminants, environmental parameters, and position, and
transmit the collected information to the at least one computing system, and
the at least one computing system is configured to:
receive the transmitted information collected by the plurality of deployable sensors,
calculate a concentration, transport, and dispersal of the contaminants using a predictive model,
produce a contamination map based on the calculated concentration, transport, and dispersal of the contaminants from the predictive model, the contamination map comprising a dispersion pattern, a deposition pattern, and a wind pattern, and
transmit the contamination map to at least one user device.

2. The system of claim 1, wherein the collected information comprises spatial data pertaining to radiation, chemical contaminants, and/or biological contaminants.

3. The system of claim 1, wherein the environmental parameters comprise wind speed and direction.

4. The system of claim 1, wherein the plurality of deployable sensors are tetrapod sensors comprising four legs in a tetrapod configuration.

5. The system of claim 1, wherein the plurality of deployable sensors comprise:
a microprocessor configured to process the collected information pertaining to contaminants, environmental parameters, and position; and
radio frequency (RF) circuitry configured to transmit the processed information pertaining to contaminants, environmental parameters, and position from the microprocessor.

6. The system of claim 5, wherein the plurality of deployable sensors further comprise:
a scintillator that emits light when struck by ionizing radiation;
a photodetector configured to produce an analog electrical signal responsive to detecting light emitted by the scintillator; and
signal processing circuitry configured to convert the analog electrical signal from the photodetector into a digital signal that can be processed by the microprocessor.

7. The system of claim 5, wherein the plurality of deployable sensors further comprise:
an environmental sensor configured to provide the environmental parameters; and
a global positioning system (GPS) configured to provide a current location.

8. The system of claim 1, wherein the information pertaining to the contaminants comprises a gamma (γ) rate, γ spectrum, and neutron rate.

9. A deployable sensor, comprising:
a sensor body housing components, the components configured to:
collect information pertaining to contaminants, environmental parameters, and position, and
transmit the collected information to the at least one computing system;
a plurality of legs attached to the sensor, the plurality of legs enabling the sensor to be deployed ballistically, dropped from manned or unmanned aircraft, or both, the at least four collapsible legs protecting the respective deployable sensor during unpowered landing after being released for deployment regardless of an orientation in which the deployable sensor lands;
at least one spring for each leg that snap the legs into a geometric configuration when released for deployment, the collapsible legs facilitating more compact packing with other deployable sensors prior to deployment; and
an environmental sensor configured to detect and provide wind data for use in determining a wind pattern when combined with wind data from other deployable sensors.

10. The deployable sensor of claim 9, wherein the collected information comprises spatial data pertaining to radiation, chemical contaminants, and/or biological contaminants.

11. The deployable sensor of claim 9, wherein the environmental parameters comprise wind speed and direction.

12. The deployable sensor of claim 9, wherein plurality of legs comprise four legs in a tetrapod configuration.

13. The deployable sensor of claim 9, wherein the components comprise:
a microprocessor configured to process the collected information pertaining to contaminants, environmental parameters, and position; and
radio frequency (RF) circuitry configured to transmit the processed information pertaining to contaminants, environmental parameters, and position from the microprocessor.

14. The deployable sensor of claim 13, wherein the components further comprise:

a scintillator that emits light when struck by ionizing radiation;
a photodetector configured to produce an analog electrical signal responsive to detecting light emitted by the scintillator; and
signal processing circuitry configured to convert the analog electrical signal from the photodetector into a digital signal that can be processed by the microprocessor.

15. The deployable sensor of claim 13, wherein the components further comprise:
an environmental sensor configured to provide the environmental parameters; and
a global positioning system (GPS) configured to provide a current location.

16. A computing system, comprising:
memory storing computer program code for predictive modeling of contaminants; and
at least one processor configured to execute the computer program code, the computing system configured to:
receive information collected by a plurality of deployable sensors pertaining to contaminants, environmental parameters, and position,
calculate a concentration, transport, and dispersal of the contaminants using a predictive model, and
produce a contamination map based on the calculated concentration, transport, and dispersal of the contaminants from the predictive model, the contamination map comprising a dispersion pattern, a deposition pattern, and a wind pattern, wherein
the computing system is part of a deployable sensor comprising at least four collapsible legs with respective springs that snap the at least four legs into a geometric configuration when released for deployment, the at least four collapsible legs protecting the respective deployable sensor during unpowered landing after being released for deployment regardless of an orientation in which the deployable sensor lands, the collapsible legs facilitating more compact packing with other deployable sensors prior to deployment.

17. The system of claim 1, further comprising:
a ballistic launch unit configured to launch the plurality of deployable sensors into a contaminated area.

18. The system of claim 1, wherein the plurality of deployable sensors that are ballistically deployable, and the plurality of legs are configured to survive impact with the ground after being launched.

19. The system of claim 1, wherein each leg is a rigid member that does not bend along its length, but bends at an end thereof via the respective springs.

* * * * *